(12) United States Patent
Patnaikuni et al.

(10) Patent No.: US 12,309,202 B2
(45) Date of Patent: May 20, 2025

(54) ENFORCING SECURITY RULES ALONG A TRAJECTORY OF DATA MOVEMENT

(71) Applicant: International Business Machines Corporation, Armonk, NY (US)

(72) Inventors: Subha Kiran Patnaikuni, Visakhapatnam (IN); Venkata Vara Prasad Karri, Visakhapatnam (IN); Sarbajit K. Rakshit, Kolkata (IN); Sri Harsha Varada, Vizianagaram (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 582 days.

(21) Appl. No.: 17/673,410

(22) Filed: Feb. 16, 2022

(65) Prior Publication Data

US 2023/0262094 A1     Aug. 17, 2023

(51) Int. Cl.
*H04L 9/40*              (2022.01)

(52) U.S. Cl.
CPC .......... *H04L 63/20* (2013.01); *H04L 63/0263* (2013.01); *H04L 63/0407* (2013.01); *H04L 63/105* (2013.01)

(58) Field of Classification Search
CPC . H04L 63/20; H04L 63/0263; H04L 63/0407; H04L 63/105
See application file for complete search history.

(56) References Cited

U.S. PATENT DOCUMENTS

| 10,158,672 B2 | 12/2018 | Shieh et al. |
| 2016/0275303 A1* | 9/2016 | Narayanaswamy .. G06F 21/554 |

(Continued)

FOREIGN PATENT DOCUMENTS

| CN | 111524007 A | 8/2020 |
| CN | 111695805 A | 9/2020 |

(Continued)

OTHER PUBLICATIONS

Mateus-Coelho et al., "Security in Microservices Architectures", 2021, Procedia Computer Science, vol. 181, pp. 1225-1236 (Year: 2021).*

(Continued)

*Primary Examiner* — Kenneth W Chang
(74) *Attorney, Agent, or Firm* — KONRAD, RAYNES, DAVDA & VICTOR LLP; Janaki K. Davda

(57) ABSTRACT

Provided are techniques for enforcing security rules along a trajectory of data movement. Confidentiality levels of source data and of processed data at different points of an existing trajectory path in an application landscape are identified by analyzing source metadata of the source data and processed metadata of the processed data. One or more trajectory paths that meet security levels that correspond to the confidentiality levels are identified by analyzing microservice generated logs and an application landscape description with reference to the confidentiality levels of the source data and the processed data. A trajectory path is selected from the one or more trajectory paths. A workflow is generated to move the source data and the processed data through the selected trajectory path, and the workflow is executed to move the source data and the processed data through microservices of the selected trajectory path while enforcing the security levels.

18 Claims, 7 Drawing Sheets

(56) References Cited

U.S. PATENT DOCUMENTS

| | | | |
|---|---|---|---|
| 2017/0177879 A1* | 6/2017 | Sharma | G06F 40/205 |
| 2019/0020665 A1 | 1/2019 | Surcouf et al. | |
| 2019/0121979 A1* | 4/2019 | Chari | G06F 8/433 |
| 2020/0320406 A1* | 10/2020 | Antonatos | G06F 21/6254 |

FOREIGN PATENT DOCUMENTS

| | | |
|---|---|---|
| CN | 111954282 A | 11/2020 |
| CN | 112073415 A | 12/2020 |

OTHER PUBLICATIONS

Yu et al., "A survey on security issues in services communication of Microservices-enabled fog applications", Nov. 2019, Concurrency and Computation: Practice and Experience, vol. 31, Issue 22, pp. 1-19 (Year: 2019).*

Gonchar, G., "Data-centric Microservices Security", [online], dated Oct. 22, 2016, Retrieved from the Internet at <URL: https://medium.com/@ggonchar/data-centric-microservices-security-6876477cd7dc>, 8 pp.

Google, "Processing Logs at Scale Using Cloud Dataflow", [online], [Retrieved on May 12, 2021], Retrieved from the Internet at <URL: https://cloud.google.com/architecture/processing-logs-at-scale-using-dataflow>, 21 pp.

Madisa, A., "Secure Inter-micro-service Communication with Spring Boot, Kafka, Vault and Kubernetes—Part 1: Introduction and Architecture", [online], Oct. 19, 2020, [Retrieved on May 12, 2021], Retrieved from the Internet at <URL: https://www.linkedin.com/pulse/secure-inter-micro-service-communication-spring-boot-kafka-madisa/?trk=read_related_article-card_title>, 4 pp.

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

Mulesoft, "Microservices and Security: Increasing Security by Increasing Surface Area", [online], © 2021 MuleSoft LLC, Retrieved from the Internet at <URL: https://www.mulesoft.com/resources/api/microservices-security>, 7 pp.

OWASP, "Microservices Security Cheat Sheet", OWASP Cheat Sheet Series, [online], ]Retrieved on May 12, 2021], Retrieved from the Internet at <URL: https://cheatsheetseries.owasp.org/cheatsheets/Microservices_security.html>, 11 pp.

softwaretestinghelp.com, "Top 40 Static Code Analysis Tools (Best Source Code Analysis Tools)", [online], [Retrieved on Aug. 30, 2021], Retrieved from the Internet at <URL: https://www.softwaretestinghelp.com/tools/top-40-static-code-analysis-tools/>, 12 pp.

Yu, D., et al., "A Survey on Security Issues in Services Communication of Microservices-enabled Fog Applications", Wiley Online Library, [online], Published Feb. 14, 2018, Retrieved from the Internet at <URL: https://onlinelibrary.wiley.com/doi/10.1002/cpe.4436>, 19 pp.

* cited by examiner

ENFORCING SECURITY RULES ALONG A TRAJECTORY OF DATA MOVEMENT

BACKGROUND

Embodiments of the invention relate to enforcing security rules along a trajectory of data movement.

In a service mesh architecture, a set of microservices communicate with each other via upstream and downstream relationships. Data is generated in one or more source systems, or with Internet of Things (IoT) enabled devices, and the data moves from one microservice to another microservice per a trajectory path to perform various processing on the data.

Also, different types of data typically have different levels of confidentiality. Since different types of data have different levels of confidentiality, the different types of data may not require the same level of security enforcement at the microservices.

SUMMARY

In accordance with certain embodiments, a computer-implemented method is provided for enforcing security rules along a trajectory of data movement. The computer-implemented method comprises operations. Confidentiality levels of source data and of processed data at different points of an existing trajectory path in an application landscape are identified by analyzing source metadata of the source data and processed metadata of the processed data. One or more trajectory paths that meet security levels that correspond to the confidentiality levels are identified by analyzing microservice generated logs and an application landscape description with reference to the confidentiality levels of the source data and the processed data. A trajectory path is selected from the one or more trajectory paths. A workflow is generated to move the source data and the processed data through the selected trajectory path, and the workflow is executed to move the source data and the processed data through microservices of the selected trajectory path while enforcing the security levels.

In accordance with other embodiments, a computer program product is provided for enforcing security rules along a trajectory of data movement. The computer program product comprises a computer readable storage medium having program code embodied therewith, the program code executable by at least one processor to perform operations. Confidentiality levels of source data and of processed data at different points of an existing trajectory path in an application landscape are identified by analyzing source metadata of the source data and processed metadata of the processed data. One or more trajectory paths that meet security levels that correspond to the confidentiality levels are identified by analyzing microservice generated logs and an application landscape description with reference to the confidentiality levels of the source data and the processed data. A trajectory path is selected from the one or more trajectory paths. A workflow is generated to move the source data and the processed data through the selected trajectory path, and the workflow is executed to move the source data and the processed data through microservices of the selected trajectory path while enforcing the security levels.

In accordance with yet other embodiments, a computer system is provided for enforcing security rules along a trajectory of data movement. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Confidentiality levels of source data and of processed data at different points of an existing trajectory path in an application landscape are identified by analyzing source metadata of the source data and processed metadata of the processed data. One or more trajectory paths that meet security levels that correspond to the confidentiality levels are identified by analyzing microservice generated logs and an application landscape description with reference to the confidentiality levels of the source data and the processed data. A trajectory path is selected from the one or more trajectory paths. A workflow is generated to move the source data and the processed data through the selected trajectory path, and the workflow is executed to move the source data and the processed data through microservices of the selected trajectory path while enforcing the security levels.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments analyze the source metadata of source data and the processed metadata of processed data to identify what types of security are to be enforced along the different trajectory paths of the data flow. Then, embodiments analyze microservice code and microservice generated logs to identify a cross microservice data flow pattern and trajectory path of data flow that enforces the identified security.

Figure 1:
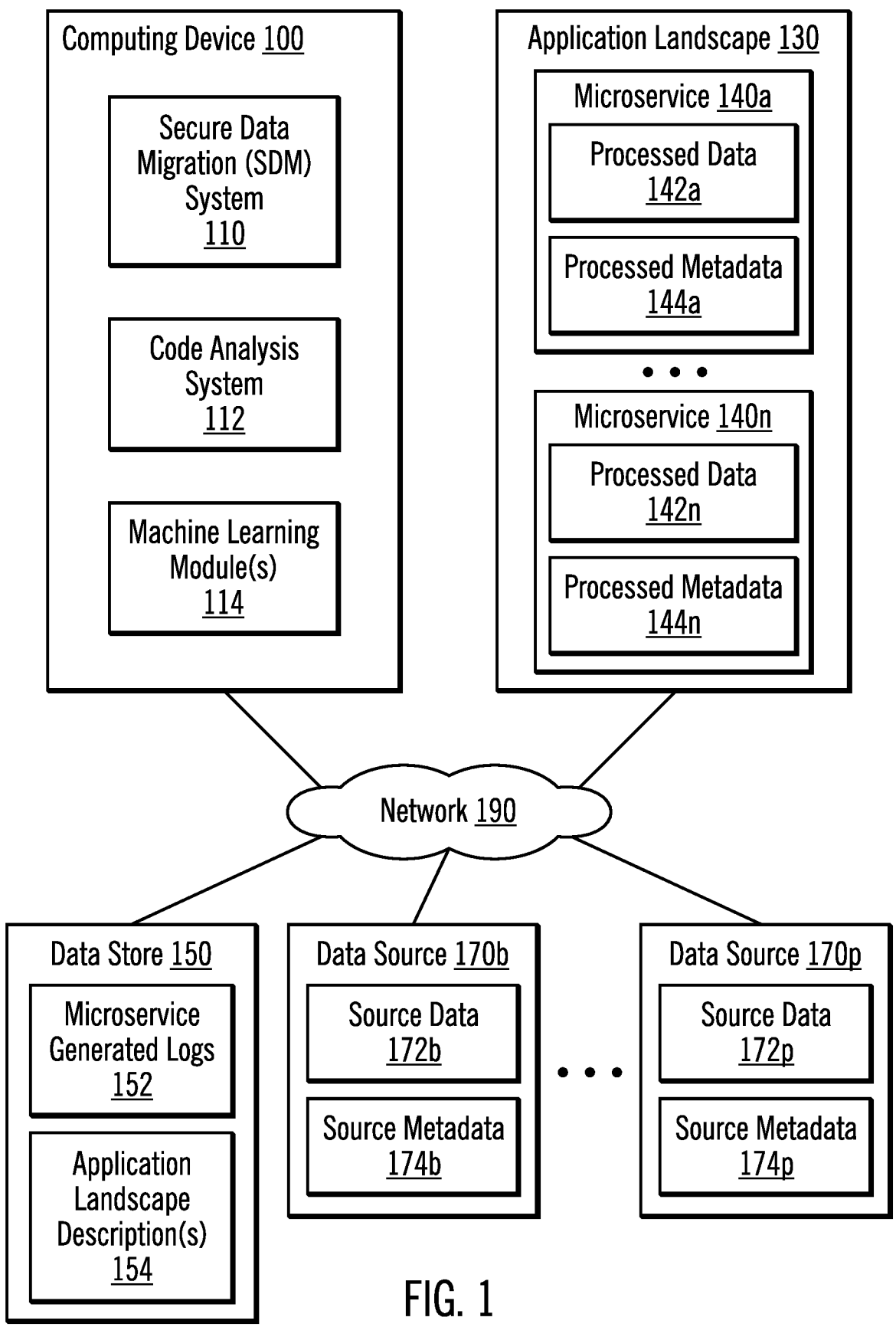
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes a Secure Data Migration (SDM) system 110, a code analysis system 112, and one or more machine learning modules. The computing device 100 is coupled to an application landscape 130 (e.g., a service mesh architecture), which includes microservices 140a . . . 140n. Each of the microservices 140a . . . 140n may be described as an application that performs one or more operations on input data to output processed data 142a . . . 142n and processed metadata 144a . . . 144n. The code analysis system 112 analyzes the code of the microservices 140a . . . 140n.

The computing device 100 is also coupled to a data store 150, which stores microservice generated logs 152 and one or more application landscape descriptions 154. Although the microservice generated logs 152 are shown in the data store 150, in certain embodiments, the microservice generated logs 152 may also be stored with each microservice 140a . . . 140n. In certain embodiments, there is one microservice generated log for each microservice.

The application landscape 130 may be described as a set of microservices 140a . . . 140n that are communicating with each other to perform various processing of source data, source metadata, processed data, and/or processed metadata. The processing may be described by a workflow. The application landscape descriptions 154 may uniquely identify the microservices 140a . . . 140n and may indicate what operations the microservices perform, what type of data the microservices typically operate on, and at what security level the operations are performed. The application landscape descriptions 154 may also be described as including requirements that describe how the microservices are related.

The microservices 140a . . . 140n add entries to the microservice generated logs to describe the operations that they performed, the data (e.g., source data or processed data output by another microservice) that they operated on, the context of the data, etc. The SDM system 110 analyzes the microservice generated logs 152 to identify cross microservice data flow patterns. These data flow patterns describe the flow of data along a trajectory path. Then, based on the trajectory path of the data (e.g., data flows through a payment Application Programming Interface (API)), the SDM system 110 determines that a microservice that processes the payment needs additional security. The SDM system 110 also analyzes the source metadata 174b . . . 174p of the source data 172b . . . 172p and further analyzes the processed metadata 144a . . . 144n of the processed data 142a . . . 142n (which is the output of the microservices 140a . . . 140n) to identify what types of security are to be enforced along different trajectory paths of the data flow. The source data 172b . . . 172p may be described as a set of data elements, and different data elements may have different confidentiality levels or a set of data elements may have the same confidentiality level. The source data 172b . . . 172p may be described as generated data when it is generated by data sources, such as sensors. The processed data 172b . . . 172p may be described as a set of data elements, and different data elements may have different confidentiality levels or a set of data elements may have the same confidentiality level. The processed data 172b . . . 172p is output by a microservice.

The source metadata 174b . . . 174p may include: a data source identifier (e.g., name), how the source data is generated, the type of the source data (e.g., customer data, medical data, traffic data, etc.) any rule defined for the type of the source data, an indication of whether the data source is generating confidential data or non-confidential data, etc.

The processed metadata 144a . . . 144n may include: a microservice identifier (e.g., name) of the microservice that has processed the data, operations performed on the processed data by the microservice, a data consumption point, etc.

For example, different microservices have different predefined operations. A payment microservice may receive Payment Card Industry (PCI) information and One-Time Password (OTP) information, which is confidential, and the SDM system 110 automatically determines a trajectory path that routes data through particular microservices to secure these data elements. Similarly, another microservice may receive Sensitive Personal Information (SPI), which is confidential, and the SDM system 110 automatically determines a trajectory path that routes data through particular microservices to secure these data elements. Confidential data may be described as data that is sensitive and should be kept private. Non-confidential data may be described as data that is not sensitive and that may be publicly available.

The trajectory path may be described as a series of microservices through which data flows. With embodiments, there may be multiple trajectory paths through which the data (source data with source metadata and processed data with processed metadata) may flow. The SDM system 110 selects the trajectory path that best enforces security enforcement techniques for the data based on the confidentiality levels.

In certain embodiments, the first microservice in the trajectory path receives source data and source metadata and outputs processed data and processed metadata to the next microservice. This next microservice of the trajectory path receives the processed data and the processed metadata and generates new processed data and new processed metadata that are output and sent to a next microservice. This occurs until the last microservice of the trajectory path outputs the final processed data and final processed metadata. In certain embodiments, the final processed data and final processed metadata are routed to another device or application for further processing (e.g., sensor data from multiple traffic sensors is processed and final processed data and final processed metadata are routed to a device that adjusts traffic signals or are routed to an application that determines whether to send assistance in case of an accident).

The computing device 100 may be coupled to the application landscape (e.g., a service mesh architecture), 130, the data store 150, and the data sources 170b . . . 170p via a network 190.

Figure 2:
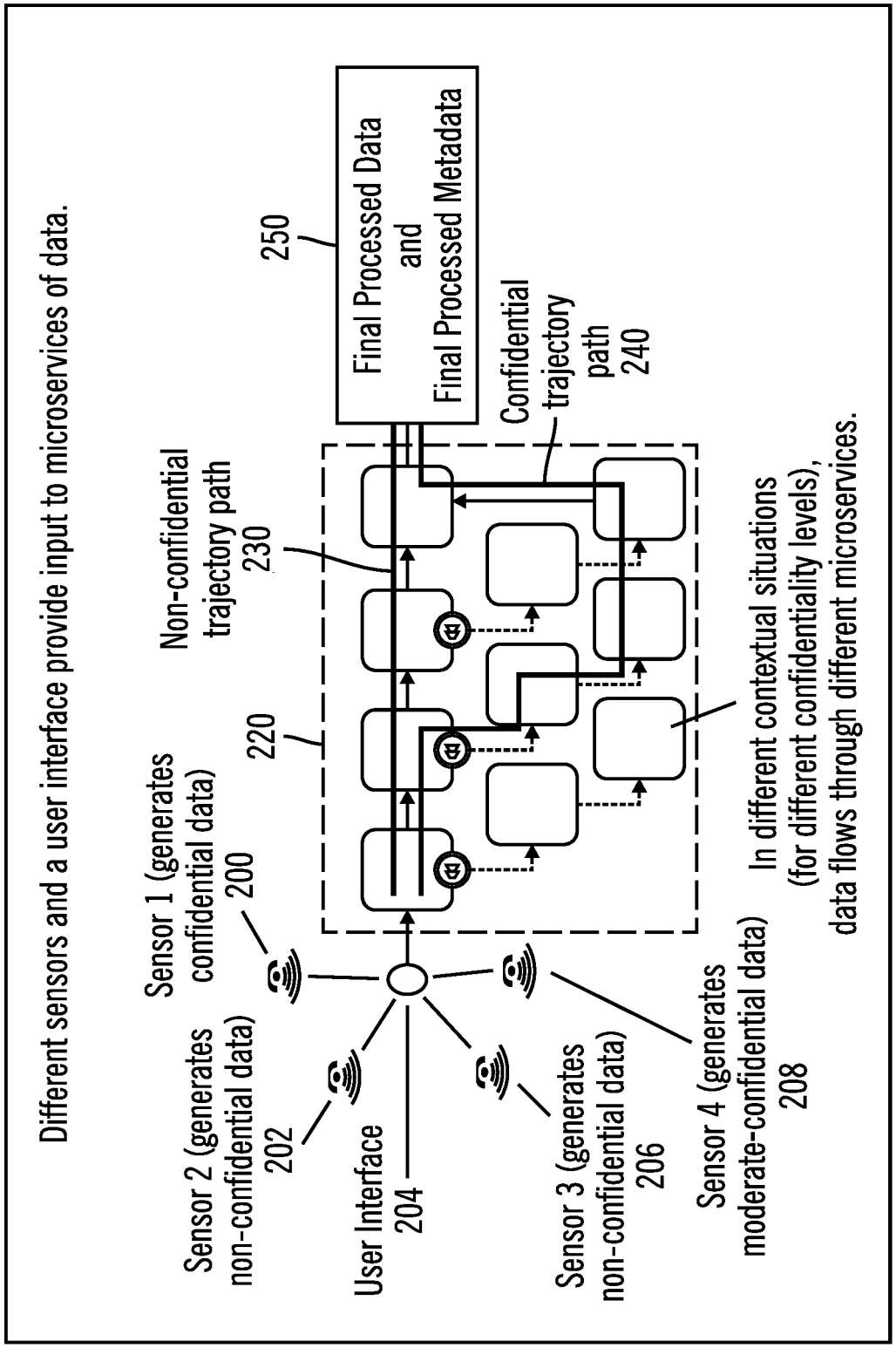
FIG. 2 illustrates microservices and trajectory paths in accordance with certain embodiments.

FIG. 2 illustrates microservices and trajectory paths in accordance with certain embodiments. The data sources 200, 202, 204, 206, 208 include sensors (which automatically capture source data) and a user interface (through which source data may be manually entered). The data sources 200, 202, 204, 206, 208 may generate confidential data or non-confidential data, along with metadata. For example, a data source 200, 202, 204, 206, 208 may generate confidential data in one context and may generate non-confidential data in another context. The confidentiality may also be at different confidentiality levels (e.g., low confidentiality, moderate confidentiality, high confidentiality, etc.).

In FIG. 2 there are microservices 220 that are part of an application landscape. Some of the different microservices 220 may perform different operations. Also, some of the different microservices may perform the same operations at different security levels to provide a different confidentiality level. The different security levels may correspond to different security enforcement techniques (e.g., redacting data, encrypting data, using additional authorization between microservices or between the data sources and the microservices, etc.).

The data sources 200, 202, 204, 206, 208 output source data and source metadata to the microservices 220. In the example of FIG. 2, there is a non-confidential trajectory path 230 through the microservices 220 to process the data in a first context, and there is a confidential trajectory path 240 through the microservices 220 to process the data in a second context. The context may be described as indicating a confidentiality level that is desired, and the confidentiality level of the data corresponds to a security level. For example, if the context is personal information, the SDM system 110 treats the personal information as having high confidentiality. Different security levels may perform different security enforcement operations (e.g., redacting data, encrypting data, etc.). Any trajectory path results in final processed data and final processed metadata 250, which may be stored or routed to another device or application that performs additional operations based on the final processed data and processed metadata.

In FIG. 2, the SDM system 110 analyzes the source metadata of the source data from the data sources 200, 202, 204, 206, 208 and the processed metadata of the processed data from any microservice 220 that processed that data. Then, the SDM system 110 determines the confidentiality level of data elements in the source data and the processed data. The SDM system 110 also analyzes the microservice generated logs to determine the operations and security levels provided by different microservices. Then, the SDM system 110 identifies the trajectory path of the data flow to provide the appropriate security levels.

In the example of FIG. 2, the SDM system 110 has identified the non-confidential trajectory path 230 through the microservices to process the source data and the processed data in a first context and the confidential trajectory path 240 through the microservices 220. Based on the confidentiality level desired by the source data and the processed data, the SDM system 110 routes the source data and the processed data through one of the trajectory paths 230, 240.

In certain embodiments, the SDM system 110 analyzes the source metadata of different data sources and analyzes the processed metadata of the processed data (output by the microservices) to identify the confidentiality level of the source data and the processed data. For example, if the source metadata of a data source, such as a sensor, indicates that the source data identifies an individual (e.g., a name or social security number), then the SDM system 110 determines that the source data has a high confidentiality level. As another example, if the source metadata indicates that the source data identifies a public park, then the SDM system 110 determines that the source data is not confidential.

Also, if the processed metadata indicates that the processed data is confidential (e.g., started out as non-confidential and has become confidential (e.g., a name has been added to a number identifying a person)), then the SDM system 110 determines that this processed data has a high confidentiality level and should be processed by a next microservice that provides the appropriate security enforcement technique.

With the analysis of the source metadata of the source data and the analysis of the processed metadata of the processed data, the SDM system 110 identifies portions of an existing trajectory path that should be modified with additional security so that the data flows through the microservices with the appropriate security levels at the microservices. For example, the SDM system 110 may suggest that a trajectory path of Microservice 1—Microservice 3—Microservice 4 should be modified to Microservice 1—Microservice 3—Microservice 5 (which replaces Microservice 4 with Microservice 5). In certain embodiments, in response to the suggestion being accepted, the SDM system 110 automatically modifies the trajectory path for the source data and the processed data, and the source data and the processed data then flows through the microservices of the modified trajectory path.

In certain embodiments, the SDM system 110 analyzes the microservice generated logs and analyzes the code of the microservices to identify trajectory paths that include different microservices for different confidentiality levels for the source data and the processed data. For example, in FIG. 2, trajectory paths 230 and 240 were identified.

In certain embodiments, when new source data is generated at any data source, the SDM system 110 analyzes the source metadata of the source data to determine whether the source data is confidential and identifies the trajectory path of the source data flow for the source data to ensure that the appropriate security enforcement techniques are applied by the microservices. In certain embodiments, when source metadata is modified at any data source, the SDM system 110 analyzes the modified source metadata of the source data to determine whether the source data is confidential and identifies the trajectory path of the data flow for the source data to ensure that the appropriate security enforcement techniques are applied by the microservices.

In certain embodiments, if the processed data of originally non-confidential data becomes confidential, then, based on the processed metadata of the processed data, the SDM system 110 identifies the trajectory path of the processed data to ensure that the appropriate security enforcement techniques are applied by the microservices that process the confidential data. That is, even if a trajectory path already exists, the SDM system 110 may modify that trajectory path based on processed data of one of the microservices in the trajectory path.

In certain embodiments, if a new data source is added, the SDM system 110 analyzes the source metadata of the new source data and analyzes the processed metadata of the processed data of the microservices that process the new source data. Then, the SDM system 110 identifies the trajectory path of the data flow for the new source data and the processed data to ensure that the appropriate security enforcement techniques are applied by the microservices.

In certain embodiments, the SDM system 110 determines whether the degree of confidentiality of the data is changed as the source data and the processed data is processed by the microservices and modifies the trajectory path of the data flow for the source data and the processed data to ensure that the appropriate security enforcement techniques are applied by the microservices.

In certain embodiments, when a trajectory path includes one or more secured microservices that receive confidential data (e.g., SPI data, PCI data, OTP data, etc.), the SDM system 110 ensures that the trajectory path includes microservices that provide the appropriate security enforcement techniques are applied by the microservices. In certain embodiments, the SDM system 110 ensures the trajectory path uses microservices that include encryption of data for privacy for confidential data. Similarly, the SDM system 110 includes microservices in the trajectory path that do not provide encryption for non-confidential data, and this is less resource intensive.

In certain embodiments, the SDM system 110 identifies a new trajectory path (e.g., due to source data and/or processed data being confidential) and identifies an existing path for this source data and processed data (e.g., by reviewing the microservice generated logs), and the SDM system 110 assigns weights to: 1) the new trajectory path; 2) the existing trajectory path (which may not treat source data and/or processed data as confidential at the microservices); and 3) one or more combinations of the new trajectory path and the existing trajectory path (which uses some of the microservices of each of these paths). The weights may be assigned based on the microservices and the security enforcement techniques used in each of the trajectory paths. In certain embodiments, based on the weights, the SDM system 110 selects a trajectory path that best provides the confidentiality desired for the source data and the processed data. In certain embodiments, the SDM system selects the trajectory path having a higher weight than other trajectory paths. Also, the SDM system 110 may use the weights to validate the confidentiality levels in a particular trajectory path.

In certain embodiments, each of the microservices has a security score that identifies what types of security data may be processed, and the SDM system 110 obtains this information from the application landscape description. Then, based on the analysis of the source metadata of the source data and the processed metadata of the processed data, the SDM system 110 selects an appropriate trajectory path that provides the determined security.

Figure 3:
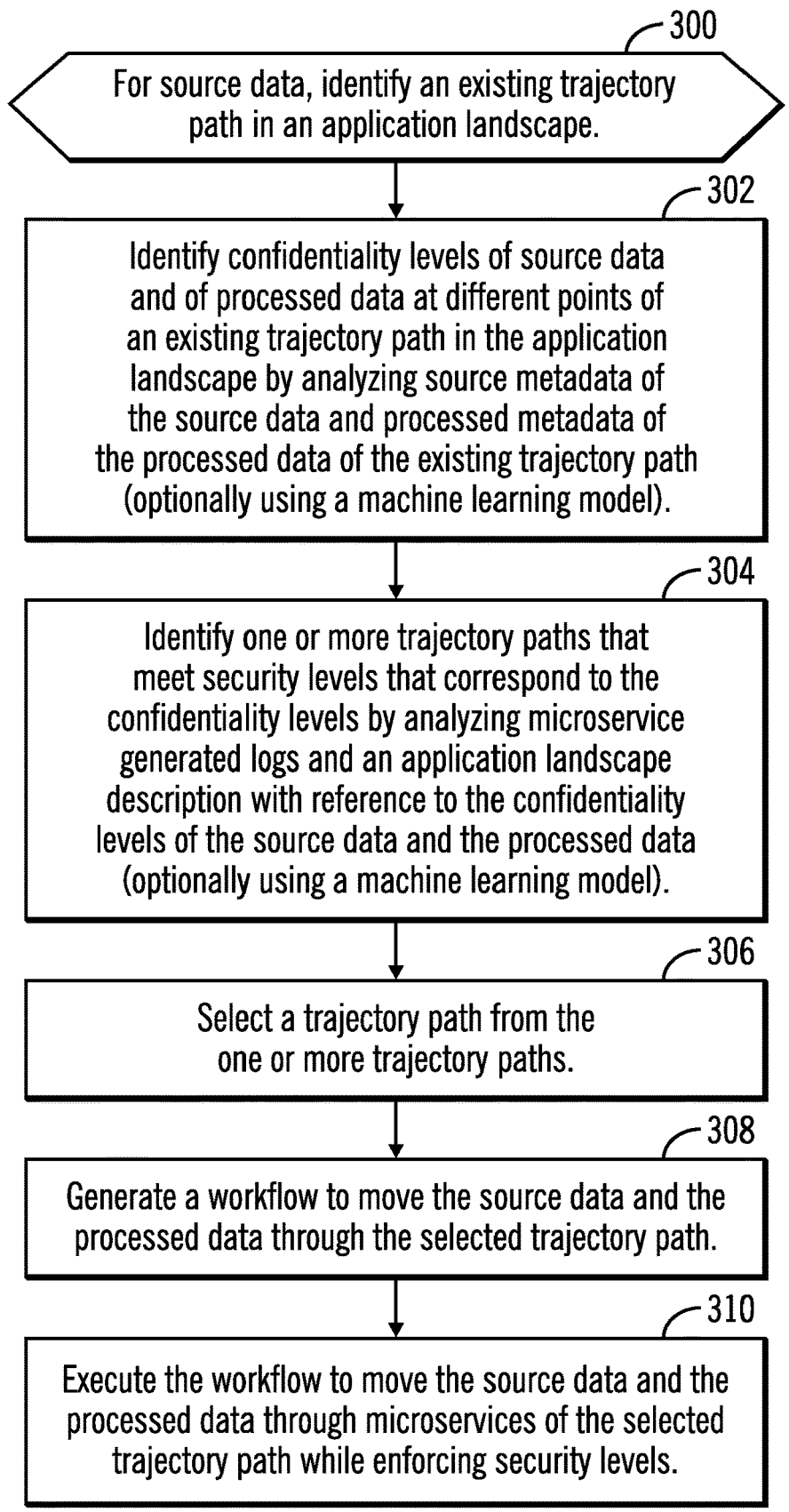
FIG. 3 illustrates, in a flowchart, operations for enforcing security rules along a trajectory path of data movement in accordance with certain embodiments.

FIG. 3 illustrates, in a flowchart, operations for enforcing security rules along a trajectory path of data movement in accordance with certain embodiments. Control begins at block 300 with the SDM system 100, for source data, identifying an existing trajectory path in an application landscape. The source data may be from one or more data sources. The source data may be a particular type of data (e.g., medical data, billing data, traffic data, etc.). In certain embodiments, the SDM system 100 determines the existing trajectory path based on the microservice generated logs, which indicate the data that was processed by the different microservices. In certain embodiments, the existing trajectory path is the last trajectory path that the data flowed through.

In block 302, the SDM system 100 identifies (determines) confidentiality levels of source data and of processed data at different points of the existing trajectory path in the application landscape by analyzing source metadata of the source data and processed metadata of the processed data of the existing trajectory path. In certain embodiments, this is done using a machine learning model.

In block 304, the SDM system 100 identifies (determines) one or more trajectory paths that meet security levels that correspond to the confidentiality levels by analyzing microservice generated logs and an application landscape description with reference to the confidentiality levels of the source data and the processed data. In certain embodiments, this is done using another machine learning model. In certain embodiments, one of the trajectory paths is a modified version of the existing trajectory path (e.g., with a microservice switched with another microservice). Each of the one or more trajectory paths includes one or more microservices that process the data.

In block 306, the SDM system 100 selects a trajectory path from the one or more trajectory paths. In certain embodiments, the selection is made based on weights determined for each of the one or more trajectory paths. In certain embodiments, the existing trajectory path may be selected.

In block 308, the SDM system 100 generates a workflow to move the source data and the processed data through the selected trajectory path. In block 310, the SDM system 100 executes the workflow to move the source data and the processed data through microservices of the selected trajectory path while enforcing security levels.

The SDM system 110 analyzes the code of the microservices and identifies different possible trajectory paths for data flow among the microservices for particular data (source data and/or processed data). In addition, the SDM system 110 may identify certain microservices that deal with sensitive data when the trajectory path should have additional security enforcement techniques.

In certain embodiments, the SDM system 110 perform code analysis by invoking the code analysis system to analyze the code of the microservices to identify the data flow patterns between the microservices, and the SDM system 110 receives the data flow patterns from the code analysis system. For example, a data flow pattern may indicate the microservices that process the source data and the processed data and the order in which they process that data (e.g., Microservice 1—Microservice 3—Microservice 7). In this manner, the SDM system 110 identifies any existing trajectory paths.

The SDM system 110 may identify data processing logic based on the code analysis and identifies how the source data and the processed data is processed to determine confidentiality levels for the processed data and to determine what security enforcement techniques are used by the microservice.

The SDM system 110 may also identify the speed of data flow for particular data along the trajectory path. Based on the identified data flow trajectory, the SDM system 110 identifies how the data is flowing along the trajectory path under different conditions.

The SDM system 110 enforces security enforcement techniques based on the data being processed on a microservice (e.g., based on which API is invoked).

Different microservices may be connected to data sources that are generating source data. The data source may be a user interface where the source data is entered may be an IoT ecosystem or image or video feed generation system.

The SDM system 110 identifies which source data is generated by which data source. This may be stored as source metadata and may be used in determining the confidentiality level of the source data. For example, source data from a bank device may be treated as having high confidentiality.

The SDM system 110 may use rules that indicate that certain metadata of the data (source data or processed data) indicates which confidentiality level is to be applied to that data (e.g., rule: if the metadata is associated with a password, treat the password as having high confidentiality). Based on the rules defined, the SDM system 110 analyzes the data and identifies the confidentiality level of the data.

Thus, with embodiments, based on the source metadata of the source data, the SDM system 110 determines the confidentiality level of the source data. Similarly, based on the processed metadata of the processed data, the SDM system 110 determines the confidentiality level of the processed data. Then, the SDM system 110 identifies the data flow trajectory path based on the confidentiality levels of the source data and the processed data.

The SDM system 110 identifies whether non-confidential data has become confidential along the trajectory path and may suggest an alternative trajectory path to process the confidential data at a determined confidentiality level.

If the SDM system 110 identifies the source data or the processed as confidential, the SDM system 110 also determines the confidentiality level for that data.

Based on the confidentiality level of the source data or the processed data, the SDM system 110 identifies where, in the trajectory path, the security enforcement techniques are to be enforced.

Embodiments may use the processed metadata of processed data for enforcing security rules along the trajectory path of data movement.

Embodiments historically analyze the microservices generated logs, analyze the code of the microservices, and identify trajectory path of data flow for different confidentiality levels of the source data and the processed data.

Enforcing security in a microservice or in the network may use additional computing power, and this will increase cloud cost, especially for an organization frequently using high security. However, embodiments identify a cost-efficient trajectory path through microservices to enforce the desired security. Embodiments provide a high level of security across the data flow in a cloud architecture at no additional cost to the client and also has improved performance by enabling security with data context.

Different types of data have different confidentiality levels. At the same time, one data element may not be confidential alone, but that non-confidential data element in combination with another data element (confidential or not) may be confidential. Moreover, an analysis outcome from processing that non-confidential data element may be confidential. That is, as data elements flow from one microservice to another microservice and are processed by those microservices along a trajectory path, the confidential levels of that data element may change. Thus, embodiments, in order to enforce security in the data elements, identify the cross microservice data trajectory path and apply the appropriate security level at each microservice.

Embodiments analyze the source metadata of source data and the processed metadata of processed data. If any source data or processed data is found to be confidential, based on its trajectory path in the application landscape, the SDM system 110 system determines which parts of the trajectory path need additional security based on the context. That is, the confidentiality level of the source data or processed data may change contextually per the data flow. By analyzing microservice generated logs and microservice service code, the SDM system 110 identifies the trajectory path. When the data source gets updated, the SDM system 110 updates the confidentiality level to be able to ensure appropriate security levels.

In some embodiments, initially a data element (of source data or processed data) may be non-confidential data. Similarly, there may be another data element (of the source data or the processed data) that is also non-confidential data. During runtime, if these data elements combine and flow through the microservices, then the combination may become confidential, which is dynamic and based on any requirements of the data. The SDM system 110 analyzes the real time logs with respect to data flow and enforces the determined security level.

If the processed data of various non-confidential data becomes confidential, then based on the metadata of the processed data the proposed system will be identifying the trajectory path of the processed data and appropriate level of security will be enforced. That is, confidentiality can vary for different data sources and also by amalgamation of different pieces of granular data (data elements), which are joined during the flow in the trajectory path and enable high security when the confidentiality is determined to be high.

Also, along the trajectory path, depending on the operation performed by each microservice, the confidentiality level may increase or decrease. For example, a trajectory path may have the following confidentiality levels: Microservice 1 (confidentiality level high)—Microservice 3 ((confidentiality level medium)—Microservice 4 (confidentiality level low)—Microservice 7 (confidentiality level high).

Embodiments enable cloud providers to give users the flexibility to have dynamically determined ("smart") security. This allows for high security where needed based on context and at different hop points in trajectory path.

Figure 4:
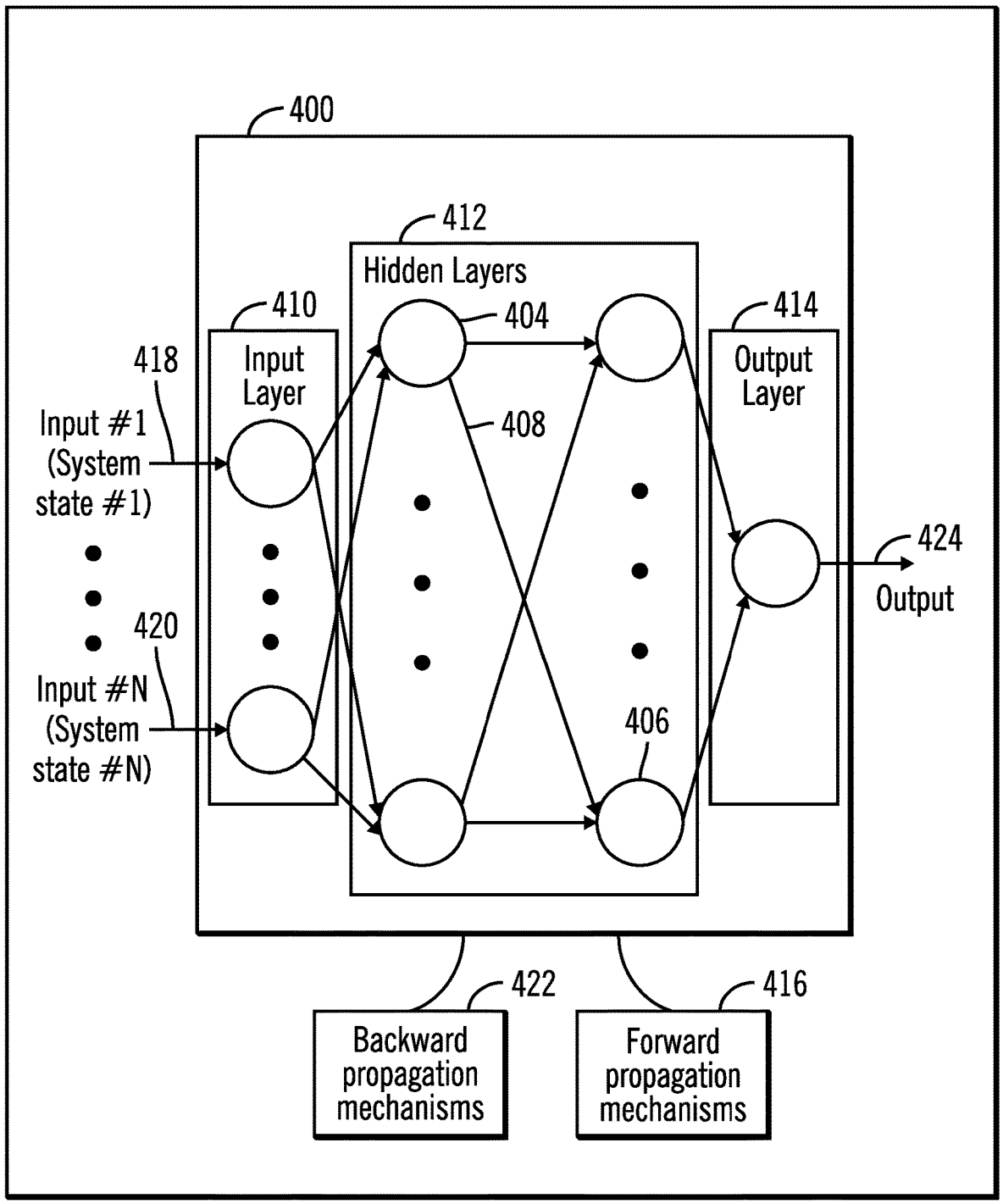
FIG. 4 illustrates, in a block diagram, details of a machine learning module 400 in accordance with certain embodiments.

FIG. 4 illustrates, in a block diagram, details of a machine learning module 400 in accordance with certain embodiments. In certain embodiments, the one or more machine learning models 114 are implemented using the components of the machine learning module 400.

The machine learning module 400 may comprise a neural network with a collection of nodes with links connecting them, where the links are referred to as connections. For example, FIG. 4 shows a node 404 connected by a connection 408 to the node 406. The collection of nodes may be organized into three main parts: an input layer 410, one or more hidden layers 412, and an output layer 414.

The connection between one node and another is represented by a number called a weight, where the weight may be either positive (if one node excites another) or negative (if one node suppresses or inhibits another). Training the machine learning module 400 entails calibrating the weights in the machine learning module 400 via mechanisms referred to as forward propagation 416 and backward propagation 422. Bias nodes that are not connected to any previous layer may also be maintained in the machine learning module 400. A bias may be described as an extra input of 1 with a weight attached to it for a node.

In forward propagation 416, a set of weights are applied to the input data 418 . . . 420 to calculate the output 424. For the first forward propagation, the set of weights may be selected randomly or set by, for example, a system administrator. That is, in the forward propagation 416, embodiments apply a set of weights to the input data 418 . . . 420 and calculate an output 424.

In backward propagation 422 a measurement is made for a margin of error of the output 424, and the weights are adjusted to decrease the error. Backward propagation 422 compares the output that the machine learning module 400 produces with the output that the machine learning module 400 was meant to produce, and uses the difference between them to modify the weights of the connections between the nodes of the machine learning module 400, starting from the output layer 414 through the hidden layers 412 to the input layer 410, i.e., going backward in the machine learning module 400. In time, backward propagation 422 causes the machine learning module 400 to learn, reducing the difference between actual and intended output to the point where the two come very close or coincide.

The machine learning module 400 may be trained using backward propagation to adjust weights at nodes in a hidden layer to produce adjusted output values based on the provided inputs 418 . . . 420. A margin of error may be determined with respect to the actual output 424 from the machine learning module 400 and an expected output to train the machine learning module 400 to produce the desired output value based on a calculated expected output. In backward propagation, the margin of error of the output may be measured and the weights at nodes in the hidden layers 412 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 400 is configured to repeat both forward and backward propagation until the weights of the machine learning module 400 are calibrated to accurately predict an output.

The machine learning module 400 implements a machine learning technique such as decision tree learning, association rule learning, artificial neural network, inductive programming logic, support vector machines, Bayesian models, etc., to determine the output value 424.

In certain machine learning module 400 implementations, weights in a hidden layer of nodes may be assigned to these inputs to indicate their predictive quality in relation to other of the inputs based on training to reach the output value 424.

With embodiments, the machine learning module 400 is a neural network, which may be described as a collection of "neurons" with "synapses" connecting them.

With embodiments, there may be multiple hidden layers 412, with the term "deep" learning implying multiple hidden layers. Hidden layers 412 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 416 and the backward propagation 422.

In backward propagation 422, embodiments measure the margin of error of the output and adjust the weights accordingly to decrease the error.

Neural networks repeat both forward and backward propagation until the weights are calibrated to accurately predict the output 424.

In certain embodiments, the inputs to the machine learning module 400 are the source metadata or the processed metadata, and the outputs of the machine learning module 400 are the confidentiality level for that data.

In certain embodiments, the inputs to the machine learning module 400 are the microservice generated logs, the application landscape description, and the confidentiality levels for the data, and the output of the machine learning module 400 is a trajectory path.

In certain embodiments, the machine learning model may be refined based on whether the outputted recommendations, once taken, generate positive outcomes.

Figure 5:
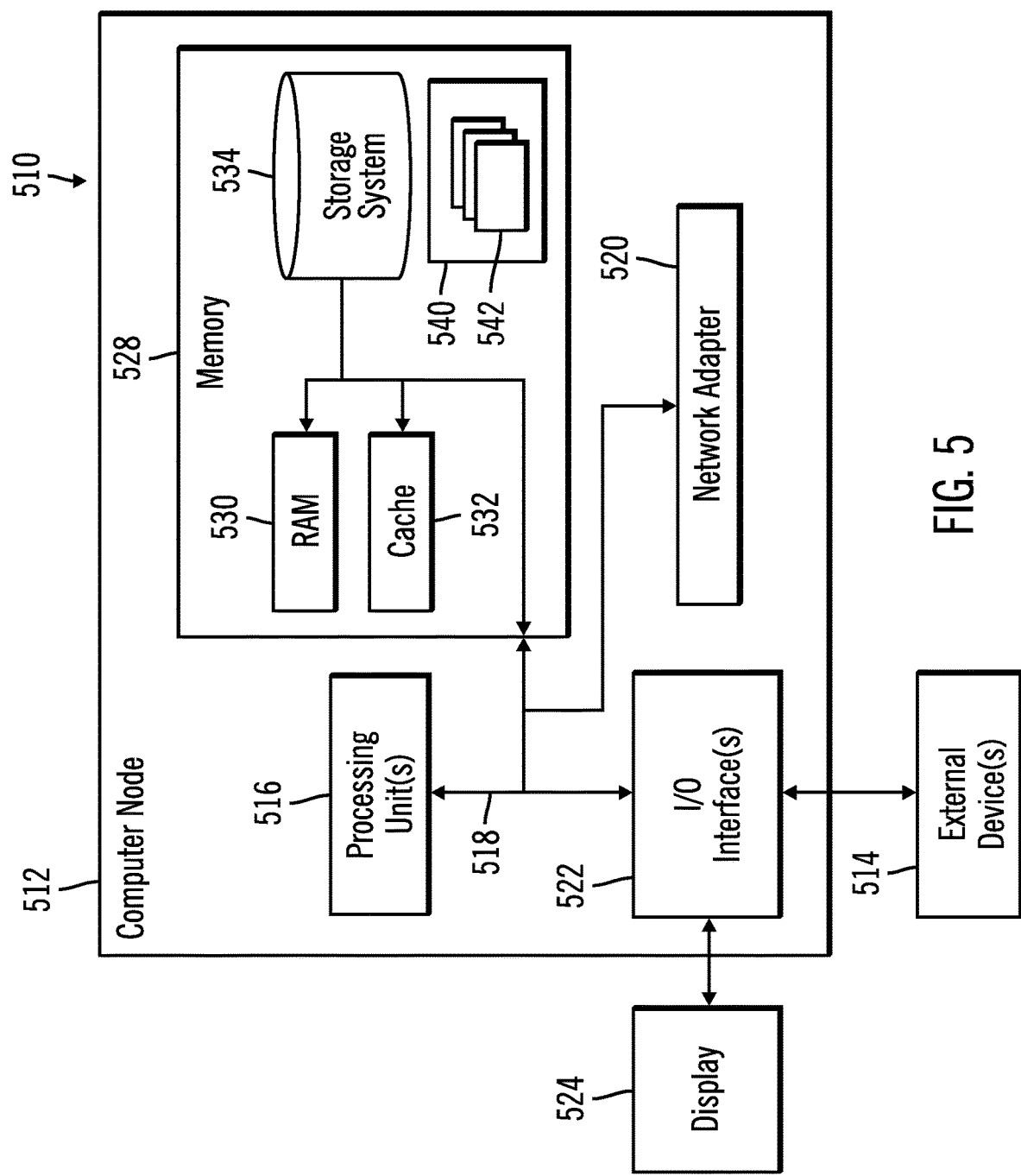
FIG. 5 illustrates a computing node in accordance with certain embodiments.

FIG. 5 illustrates a computing environment 510 in accordance with certain embodiments. In certain embodiments, the computing environment is a cloud computing environment. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 100 has the architecture of computer node 512. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
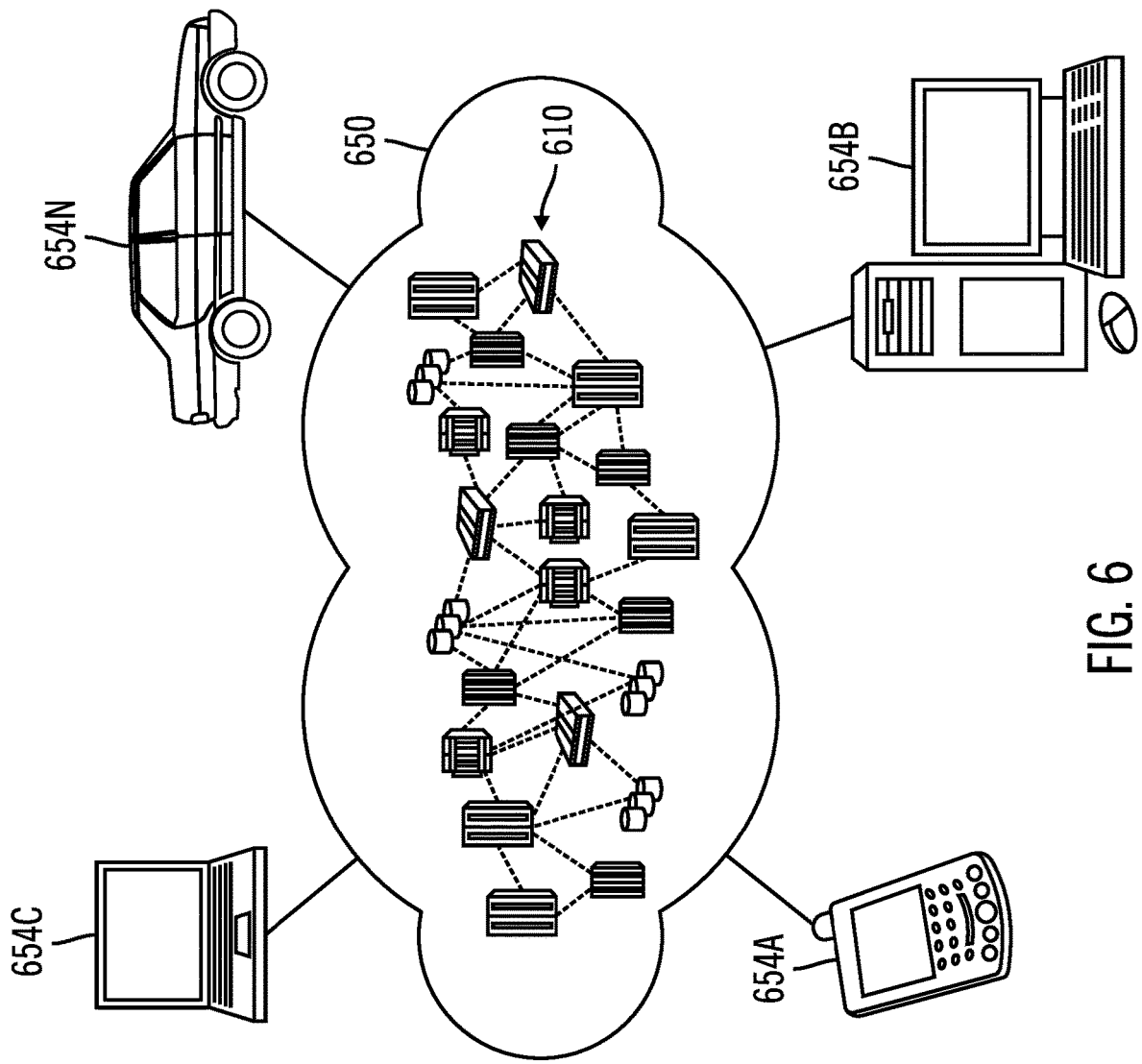
FIG. 6 illustrates a cloud computing environment in accordance with certain embodiments.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
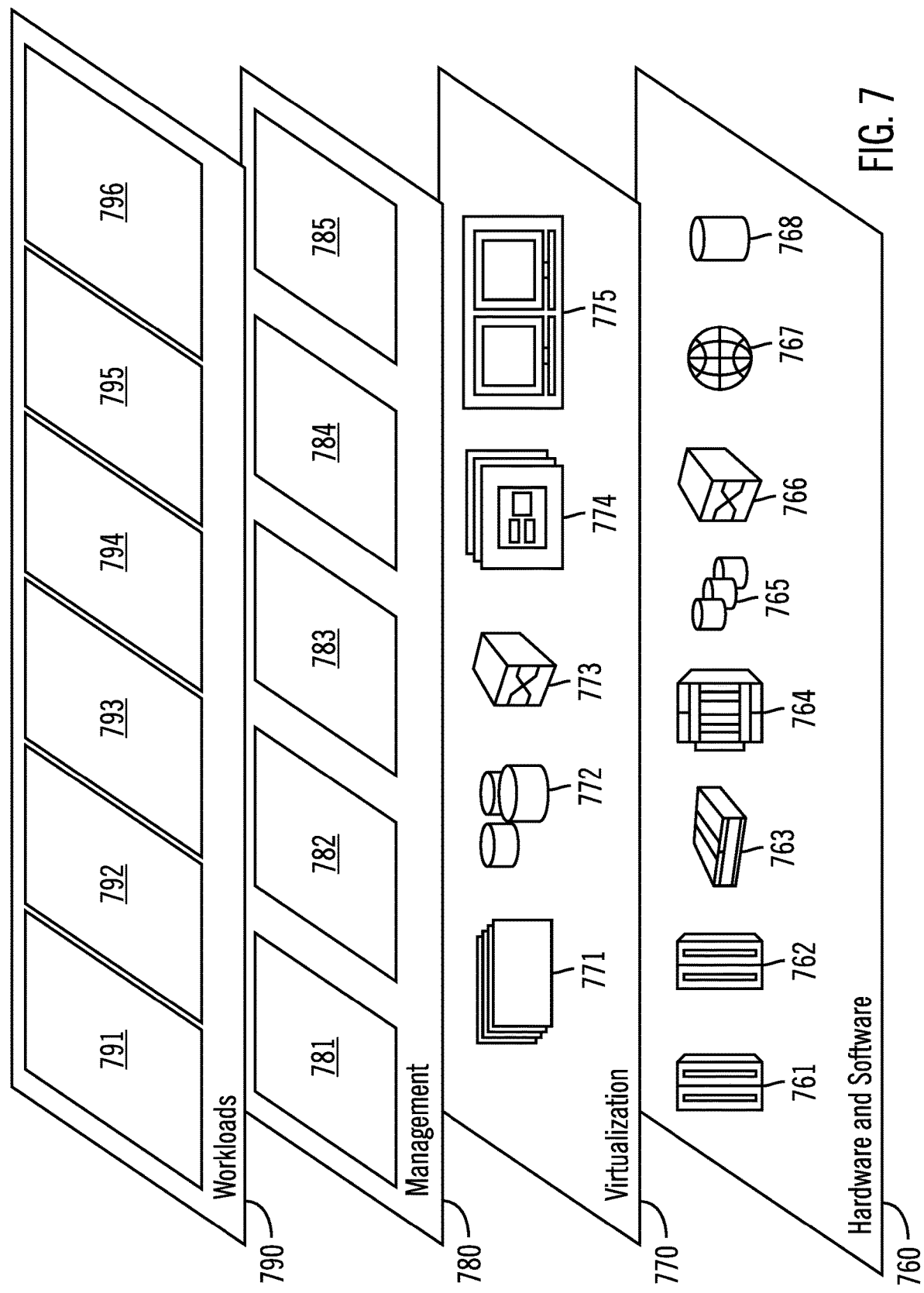
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and enforcing security rules along a trajectory of data movement 796.

Thus, in certain embodiments, software or a program, implementing enforcing security rules along a trajectory of data movement in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   identifying confidentiality levels of source data and of processed data at different points of an existing trajectory path in an application landscape by analyzing source metadata of the source data and processed metadata of the processed data;

identifying one or more trajectory paths that meet security levels that correspond to the confidentiality levels by analyzing microservice generated logs and an application landscape description with reference to the confidentiality levels of the source data and the processed data;

selecting a trajectory path from the one or more trajectory paths;

generating a workflow to move the source data and the processed data through the selected trajectory path; and executing the workflow to move the source data and the processed data through microservices of the selected trajectory path while enforcing the security levels.

2. The computer-implemented method of claim 1, further comprising operations for:

assigning weights to the one or more trajectory paths, wherein the trajectory path is selected based on having a higher weight than other trajectory paths.

3. The computer-implemented method of claim 1, further comprising operations for:

analyzing code of the microservices to identify data flow patterns between the microservices, wherein one of the data flow patterns corresponds to the existing trajectory path.

4. The computer-implemented method of claim 1, wherein a first data element of the source data is non-confidential, wherein the first data element is combined with a second data element, and wherein the combined first data element and the second data element is confidential.

5. The computer-implemented method of claim 1, further comprising operations for:

in response to receiving new source data, identifying a new trajectory path.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations for:

identifying confidentiality levels of source data and of processed data at different points of an existing trajectory path in an application landscape by analyzing source metadata of the source data and processed metadata of the processed data;

identifying one or more trajectory paths that meet security levels that correspond to the confidentiality levels by analyzing microservice generated logs and an application landscape description with reference to the confidentiality levels of the source data and the processed data;

selecting a trajectory path from the one or more trajectory paths;

generating a workflow to move the source data and the processed data through the selected trajectory path; and executing the workflow to move the source data and the processed data through microservices of the selected trajectory path while enforcing the security levels.

8. The computer program product of claim 7, wherein the program code is executable by the at least one processor to perform operations for:

assigning weights to the one or more trajectory paths, wherein the trajectory path is selected based on having a higher weight than other trajectory paths.

9. The computer program product of claim 7, wherein the program code is executable by the at least one processor to perform operations for:

analyzing code of the microservices to identify data flow patterns between the microservices, wherein one of the data flow patterns corresponds to the existing trajectory path.

10. The computer program product of claim 7, wherein a first data element of the source data is non-confidential, wherein the first data element is combined with a second data element, and wherein the combined first data element and the second data element is confidential.

11. The computer program product of claim 7, wherein the program code is executable by the at least one processor to perform operations for:

in response to receiving new source data, identifying a new trajectory path.

12. The computer program product of claim 7, wherein a Software as a Service (SaaS) is configured to perform the operations of the computer program product.

13. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

identifying confidentiality levels of source data and of processed data at different points of an existing trajectory path in an application landscape by analyzing source metadata of the source data and processed metadata of the processed data;

identifying one or more trajectory paths that meet security levels that correspond to the confidentiality levels by analyzing microservice generated logs and an application landscape description with reference to the confidentiality levels of the source data and the processed data;

selecting a trajectory path from the one or more trajectory paths;

generating a workflow to move the source data and the processed data through the selected trajectory path; and executing the workflow to move the source data and the processed data through microservices of the selected trajectory path while enforcing the security levels.

14. The computer system of claim 13, wherein the operations further comprise:

assigning weights to the one or more trajectory paths, wherein the trajectory path is selected based on having a higher weight than other trajectory paths.

15. The computer system of claim 13, wherein the operations further comprise:

analyzing code of the microservices to identify data flow patterns between the microservices, wherein one of the data flow patterns corresponds to the existing trajectory path.

16. The computer system of claim 13, wherein a first data element of the source data is non-confidential, wherein the first data element is combined with a second data element, and wherein the combined first data element and the second data element is confidential.

17. The computer system of claim 13, wherein the operations further comprise:
  in response to receiving new source data, identifying a new trajectory path.

18. The computer system of claim 13, wherein a Software as a Service (Saas) is configured to perform the operations of the computer system.

\* \* \* \* \*